US012770084B2

(12) United States Patent
Bakshi et al.

(10) Patent No.: US 12,770,084 B2
(45) Date of Patent: Oct. 20, 2026

(54) SEMI-DYNAMIC VULNERABILITY DETECTION

(71) Applicant: Bank of America Corporation, Charlotte, NC (US)

(72) Inventors: Sakshi Bakshi, New Delhi (IN); Kapil Bajaj, Delhi (IN); Saurabh Rajpal, Telangana (IN); Shilpi Choudhari, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 136 days.

(21) Appl. No.: 18/732,986

(22) Filed: Jun. 4, 2024

(65) Prior Publication Data

US 2025/0371472 A1 Dec. 4, 2025

(51) Int. Cl.
*G06Q 10/0635* (2023.01)
*G06Q 10/0633* (2023.01)

(52) U.S. Cl.
CPC ..... *G06Q 10/0635* (2013.01); *G06Q 10/0633* (2013.01)

(58) Field of Classification Search
CPC ........................................... G06Q 10/00–50/00
USPC ................................................ 705/7.11–7.42
See application file for complete search history.

(56) References Cited

U.S. PATENT DOCUMENTS 9,032,529 B2 5/2015 Amit et al.
9,268,945 B2 2/2016 Williams et al.
11,010,472 B1 5/2021 Powers et al.
11,244,044 B1 2/2022 Malik et al.
11,526,614 B2 12/2022 Fang
11,550,912 B2 1/2023 Das et al.
11,722,514 B1 8/2023 Reguly et al.
2017/0286572 A1* 10/2017 Hershey .................... B64F 5/60
2018/0121802 A1* 5/2018 Ruckauer ............. G06N 3/0464
2019/0122110 A1* 4/2019 Ruckauer ............. G06N 3/0464
2019/0258747 A1* 8/2019 Milev ................. G06F 16/9032
2019/0347546 A1* 11/2019 Pei ......................... G06N 3/049
2020/0026992 A1* 1/2020 Zhang .................. G06N 3/0442
(Continued)

OTHER PUBLICATIONS https://web.archive.org/web/20230314195516/https://en.wikipedia.org/wiki/Knowledge_graph (Year: 2023).*
(Continued)

*Primary Examiner* — Alan S Miller
(74) *Attorney, Agent, or Firm* — Banner & Witcoff, Ltd.

(57) ABSTRACT

Arrangements for providing semi-dynamic vulnerability detection are provided. In some aspects, a computing platform may receive work flow data from one or more systems and may analyze the work flow data using a GAN. The GAN may output a potential vulnerability identified in the data, and a category of the potential vulnerability. Based on the potential vulnerability and the category, the computing platform may determine a severity of the potential vulnerability. An ANN-SNN converter may be executed to output a knowledge graph including a plurality of nodes forming a mitigation action plan for the potential vulnerability. The computing platform may generate a digital twin of the knowledge graph and may then reconcile the digital twin by back tracking through each node to validate each node of the digital twin. Based on the digital twin being reconciled, the generated mitigation action plan may be transmitted to a computing system for execution.

20 Claims, 10 Drawing Sheets

(56) References Cited

U.S. PATENT DOCUMENTS

| | | | | |
|---|---|---|---|---|
| 2020/0184053 | A1* | 6/2020 | Kursun | G06N 3/094 |
| 2020/0257973 | A1* | 8/2020 | Park | G06N 3/09 |
| 2020/0396231 | A1* | 12/2020 | Krebs | H04L 63/1425 |
| 2021/0019674 | A1* | 1/2021 | Crabtree | G06V 30/274 |
| 2021/0133568 | A1* | 5/2021 | Voelker | G06F 7/588 |
| 2021/0174952 | A1* | 6/2021 | Leong | G06N 20/00 |
| 2021/0350236 | A1* | 11/2021 | Severa | G06F 18/2113 |
| 2022/0358346 | A1* | 11/2022 | Gupta | G06N 3/065 |
| 2022/0374679 | A1* | 11/2022 | Bazhenov | G06N 3/049 |
| 2023/0168743 | A1* | 6/2023 | Gigie | G06F 3/017 367/95 |
| 2023/0325001 | A1* | 10/2023 | Gigie | G01S 15/876 345/156 |
| 2023/0370439 | A1* | 11/2023 | Crabtree | H04L 63/0428 |
| 2023/0386195 | A1* | 11/2023 | Qian | G06V 10/774 |
| 2024/0028036 | A1* | 1/2024 | Yang | G05D 1/0088 |
| 2024/0046001 | A1* | 2/2024 | Brandl | G06Q 10/10 |
| 2024/0070443 | A1* | 2/2024 | Sakemi | G06N 3/0499 |
| 2024/0086690 | A1* | 3/2024 | Zhou | G06N 3/049 |
| 2024/0112024 | A1* | 4/2024 | Park | G06N 3/049 |
| 2024/0212672 | A1* | 6/2024 | Odame | G10L 15/16 |
| 2024/0275798 | A1* | 8/2024 | Soler Garrido | G06F 21/552 |
| 2024/0320472 | A1* | 9/2024 | Yoo | G06N 3/049 |
| 2024/0403513 | A1* | 12/2024 | Antonopoulos | G06F 30/20 |
| 2025/0200345 | A1* | 6/2025 | Stanojevic | G06N 3/0985 |

OTHER PUBLICATIONS

Muramatsu, Naoya, Hai-Tao Yu, and Tetsuji Satoh. "Combining spiking neural networks with artificial neural networks for enhanced image classification." IEICE Transactions on Information and Systems 106.2 (2023): 252-261. (Year: 2023).*

Yousefzadeh, Amirreza, et al. "Conversion of synchronous artificial neural network to asynchronous spiking neural network using sigma-delta quantization." 2019 IEEE International Conference on Artificial Intelligence Circuits and Systems (AICAS). IEEE, 2019. (Year: 2019).* https://web.archive.org/web/20230301233702/https://en.wikipedia.org/wiki/Digital_twin (Year: 2023).*

Gilliard, Ezekia, Jinshuo Liu, and Ahmed Abubakar Aliyu. "Knowledge graph reasoning for cyber attack detection." IET Communications 18.4 (2024): 297-308. (Year: 2024).*

* cited by examiner

SEMI-DYNAMIC VULNERABILITY DETECTION

BACKGROUND

Aspects of the disclosure relate to electrical computers, systems, and devices for semi-dynamic vulnerability detection.

Vulnerability detection is an ever-changing challenge for enterprise organizations. As market and business factors change, risks and treats to an enterprise organization are also changing. Accordingly, static approaches to vulnerability detection, that are common in conventional arrangements, might not be suited to detect these every-changing threats. For instance, conventional assessment methodologies are focused on day-to-day operational risks and are less sensitive to emerging vulnerability patterns driven by changing global situations, new phishing or hacking methods, market volatility, and the like. Accordingly, it would be advantageous to provide an end-to-end model to assess emerging vulnerabilities encompassing internal and external factors and identify potential mitigation strategies.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with vulnerability detection.

In some aspects, a computing platform may receive work flow data from one or more systems. The computing platform may analyze the work flow data using, for instance, a generative adversarial network (GAN), to identify potential vulnerabilities in the work flow data. In some examples, the GAN may output a potential vulnerability identified in the data, as well as a category of the potential vulnerability. Based on the potential vulnerability and the identified category, the computing platform may determine a severity of the potential vulnerability.

In some examples, an artificial neural network (ANN)-spiking neural network (SNN) converter may be executed based on the potential vulnerability, determined category and severity. The ANN-SNN converter may output a knowledge graph including a plurality of nodes forming a mitigation action plan for the potential vulnerability. The computing platform may generate a digital twin of the knowledge graph. The computing platform may then reconcile or validate the digital twin by back tracking through each node to validate each node of the digital twin. Based on the digital twin being reconciled or validated, the generated mitigation action plan may be transmitted to a computing system for execution.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, conventional vulnerability assessment methodologies might not be suited to the current, ever-changing variety of vulnerabilities faced by enterprise organizations. Accordingly, aspects described herein provide for use of multiple artificial intelligence/machine learning (AI/ML) models that assess work flow data to identify vulnerabilities and a category and severity of a vulnerability, determine whether that vulnerability exceeds a threshold for evaluation, using a combination artificial neural network (ANN)-spiking neural network (SNN) converter to generate a mitigation action plan based on a knowledge graph having a plurality of nodes, and reconciling the knowledge graph by generating a digital twin that is then evaluated by backtracking, node-by-node, through the digital twin to validate each node.

These and various other arrangements will be discussed more fully below.

Figure 1A:
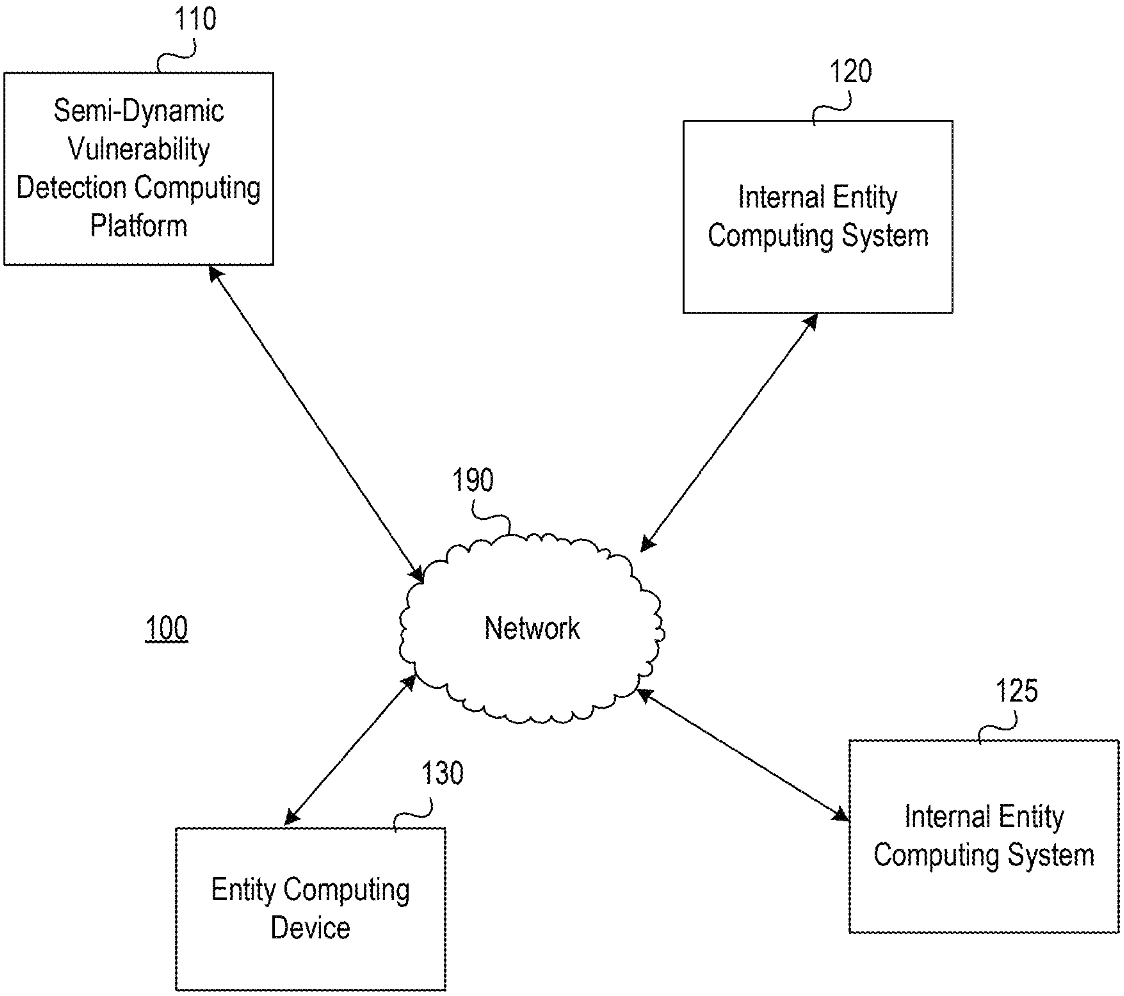
FIGS. 1A-1B depict an illustrative computing environment for implementing semi-dynamic vulnerability detection in accordance with one or more aspects described herein.
Figure 1B:
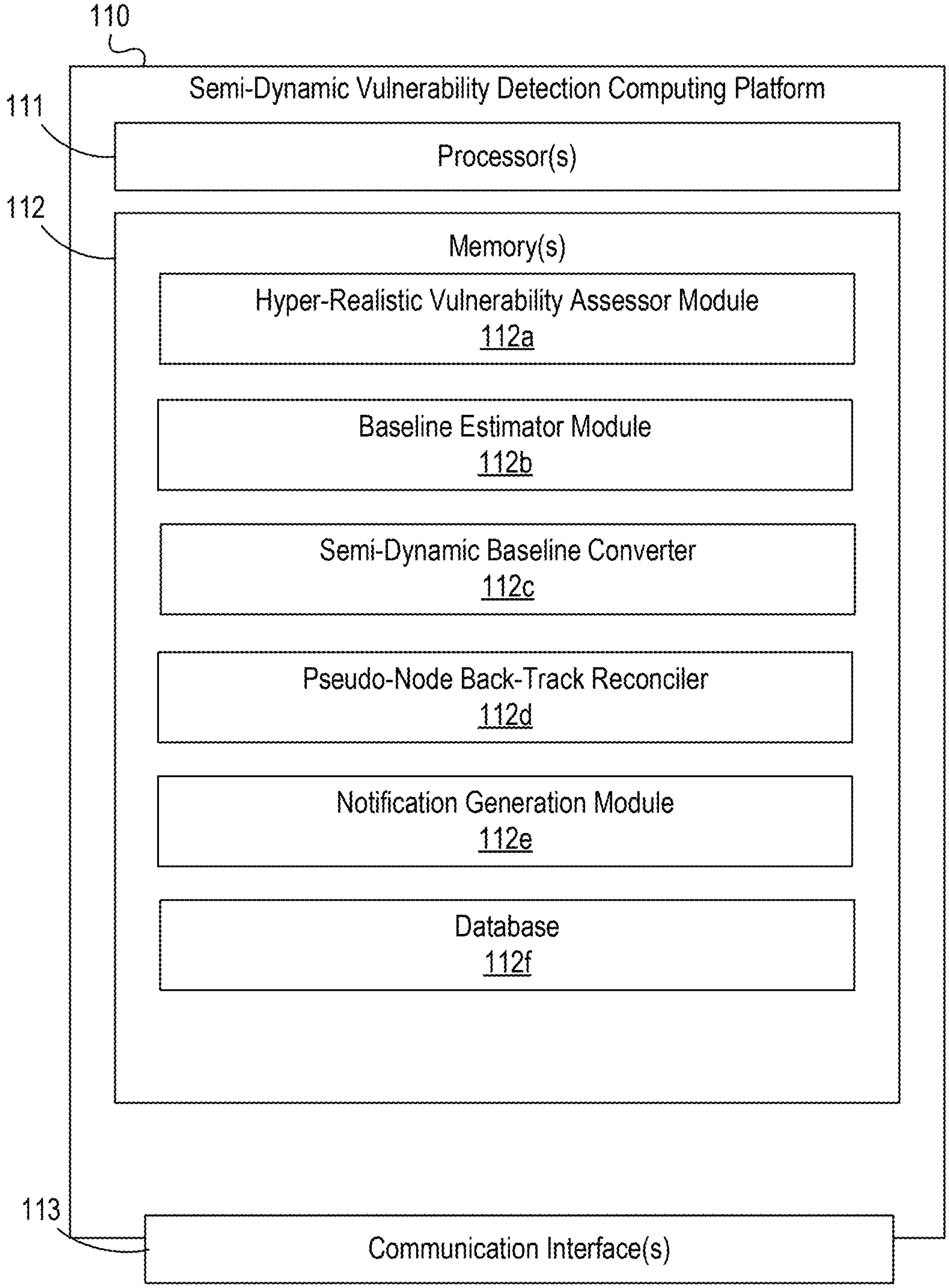

FIGS. 1A-1B depict an illustrative computing environment and devices for implementing semi-dynamic vulnerability detection in accordance with one or more aspects described herein. Referring to FIG. 1A, computing environment 100 may include one or more computing devices and/or other computing systems. For example, computing environment 100 may include semi-dynamic vulnerability detection computing platform 110, internal entity computing system 120, internal entity computing system 125, and entity computing device 130.

Although two internal entity computing systems 120, 125, and one entity computing device 130, are shown, any number of systems or devices may be used without departing from the invention.

Semi-dynamic vulnerability detection computing platform 110 may be configured to perform intelligent, dynamic, real-time vulnerability detection and mitigation plan identification and execution. For instance, semi-dynamic vulnerability detection computing platform 110 may be configured to receive, from a plurality of internal entity computing devices, such as internal entity computing system 120, internal entity computing system 125, and the like, work flow data. The work flow data may be analyzed by a hyper-realistic vulnerability assessment module of the semi-dynamic vulnerability detection computing platform 110 using a generative adversarial network (GAN)-based artificial intelligence (AI) powered generator and discriminator to identify potential vulnerabilities in the work flow data. In some examples, the hyper-realistic vulnerability assessment module may identify a category associated with any identified potential vulnerabilities. In some example, categories may include internal, external, technology-based, people-based, and the like.

Semi-dynamic vulnerability detection computing platform 110 may further identify a severity of the potential vulnerability using, for instance, a spiking neural network (SNN)-based severity validator and baseline estimator. The severity validator and baseline estimator may determine a severity of the potential vulnerability and may identify a baseline or threshold for vulnerabilities of that category to determine whether the potential vulnerability severity meets or exceeds the threshold. If so, the potential vulnerability will be further evaluated to identify a mitigation action play.

Semi-dynamic vulnerability detection computing platform 110 may analyze the potential vulnerability, category and severity using a semi-dynamic baseline converter that may include an ANN-SNN converter to generate a mitigation action plan including a knowledge graph having a plurality of nodes. The dynamic graph unfolds to identify the mitigation action plan for the identified severity and risk category.

Semi-dynamic vulnerability detection computing platform 110 may further generate a digital twin of the knowledge graph. The digital twin may be analyzed using a back-track reconciler to validate, in reverse order or by reverse engineering, each node in the knowledge graph corresponding to the mitigation action plan. If the nodes are validated, the mitigation action plan may be transmitted to a computing device, such as entity computing device 130, for evaluation and/or execution. If one or more nodes are not validated (e.g., a discrepancy exists), a notification may be generated, one or more models may be tuned and the potential vulnerability may be reassessed.

Internal entity computing system 120 and/or internal entity computing system 125 may include one or more computer components (e.g., servers, server blades, memory, processors, or the like) that may host or execute one or more applications of an enterprise organization. Accordingly, internal entity computing system 120 and/or internal entity computing system 125 may generate work flow data for analysis by the semi-dynamic vulnerability detection computing platform 110.

Entity computing device 130 may be or include one or more computing devices, such as a laptop, desktop, smartphone, mobile device, wearable device, or the like. Entity computing device 130 may be configured to receive input to control or moderate parameters of the models used by the semi-dynamic vulnerability detection computing platform 110, control execution of a mitigation action plan, and the like. Entity computing device 130 may also receive and display one or more notifications.

As mentioned above, computing environment 100 also may include one or more networks, which may interconnect one or more of semi-dynamic vulnerability detection computing platform 110, internal entity computing system 120, internal entity computing system 125, and/or entity computing device 130. For example, computing environment 100 may include network 190, which may be a public or private network. Network 190 may include one or more sub-networks (e.g., Local Area Networks (LANs), Wide Area Networks (WANs), or the like). Network 190 may interconnect one or more computing devices associated with the organization. For example, semi-dynamic vulnerability detection computing platform 110, internal entity computing system 120, internal entity computing system 125, and/or entity computing device 130 may be connected via network 190 to interconnect semi-dynamic vulnerability detection computing platform 110, internal entity computing system 120, internal entity computing system 125, and/or entity computing device 130.

Referring to FIG. 1B, semi-dynamic vulnerability detection computing platform 110 may include one or more processors 111, memory 112, and communication interface 113. A data bus may interconnect processor(s) 111, memory 112, and communication interface 113. Communication interface 113 may be a network interface configured to support communication between semi-dynamic vulnerability detection computing platform 110 and one or more networks (e.g., private network 190, or the like). Memory 112 may include one or more program modules having instructions that when executed by processor(s) 111 cause semi-dynamic vulnerability detection computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of semi-dynamic vulnerability detection computing platform 110 and/or by different computing devices that may form and/or otherwise make up semi-dynamic vulnerability detection computing platform 110.

For example, memory 112 may have, store and/or include hyper-realistic vulnerability assessor module **112*a*. Hyper-realistic vulnerability assessor module 112*a* may store instructions and/or data that may cause or enable the semi-dynamic vulnerability detection computing platform 110 to receive work flow data from one or more enterprise organization systems or devices, such as internal entity computing system 120, internal entity computing system 125**, or the like. In some examples, a GAN-based AI powered generator and discriminator may analyze the work flow data to identify, in real-time or near real-time, a potential vulnerability and identify a category associated with any identified potential vulnerabilities. In some examples, the category may be selected from predefined categories such as, external vulnerabilities, people based vulnerabilities, process based vulnerabilities, technology based vulnerabilities, information security based vulnerabilities, or the like.

Semi-dynamic vulnerability detection computing platform 110 may further have, store and/or include baseline estimator module **112*b*. Baseline estimator module 112*b* may store instructions and/or data that may cause or enable the semi-dynamic vulnerability detection computing platform 110** to further analyze the identified potential vulnerabilities and associated category to determine a severity of the potential vulnerability, as well as a baseline or threshold value over which a potential vulnerability will be further analyzed. For instance, an SNN based severity validator may determine a severity tag for the identified potential vulnerability and may determine a continuous, evolving baseline for vulnerabilities of that category. In some examples, a leaky-integration model may be used to determine the baseline or threshold.

Semi-dynamic vulnerability detection computing platform 110 may further have, store and/or include semi-dynamic baseline converter module 112*c*. Semi-dynamic baseline converter module 112*c* may store instructions and/or data that may cause or enable the semi-dynamic vulnerability detection computing platform 110 to execute an ANN-SNN converter based on the identified potential vulnerability, category and severity value. For instance, the ANN-SNN converter may take identified potential vulnerability and category as inputs and may use graph nodes to assign values to ANN and SNN based algorithms to form different correlations between parameters. In some examples, the values may be fed or input to parameterized graph nodes having predetermined range variations that detect benchmark spike changes. In some arrangements, the semi-dynamic baseline converter module 112*c* may generate a knowledge graph having a plurality of nodes that, when unfolded, provide a mitigation action plan to execute in order to mitigate impact of the identified potential vulnerability.

Semi-dynamic vulnerability detection computing platform 110 may further have, store and/or include pseudo-node back-track reconciler 112*d*. The pseudo-node back-track reconciler may store instructions and/or data that may cause or enable the semi-dynamic vulnerability detection computing platform 110 to generate a digital twin of the knowledge graph used to generate the mitigation action plan. The pseudo-node back-track reconciler 112*d* may then reverse engineer the action plan, node by node, back tracking every step to reconcile each step or node in the plan. For instance, the process may reconcile the values at each previous step leading to the current state or value. This arrangement enables validation of the mitigation action plan while re-folding the nodes of the graph into the original state to free up values and avoid storing additional data.

Semi-dynamic vulnerability detection computing platform 110 may further have, store and/or include notification generation module 112*e*. Notification generation module 112*e* may store instructions and/or data that may cause or enable the semi-dynamic vulnerability detection computing platform 110 to generate one or more notifications indicating detected vulnerabilities, mitigation action plans, validation of the play and/or discrepancies or issues detected in validating the action plan, and the like. The notifications may be transmitted or sent to one or more computing devices for display.

Semi-dynamic vulnerability detection computing platform 110 may further have, store and/or include database 112*f*. Database 112*f* may store data to perform the functions of the semi-dynamic vulnerability detection computing platform 110.

FIGS. 2A-2D depict one example illustrative event sequence for semi-dynamic vulnerability detection in accordance with one or more aspects described herein. The events shown in the illustrative event sequence are merely one example sequence and additional events may be added, or events may be omitted, without departing from the invention. Further, one or more processes discussed with respect to FIGS. 2A-2D may be performed in real-time or near real-time.

Figure 2A:
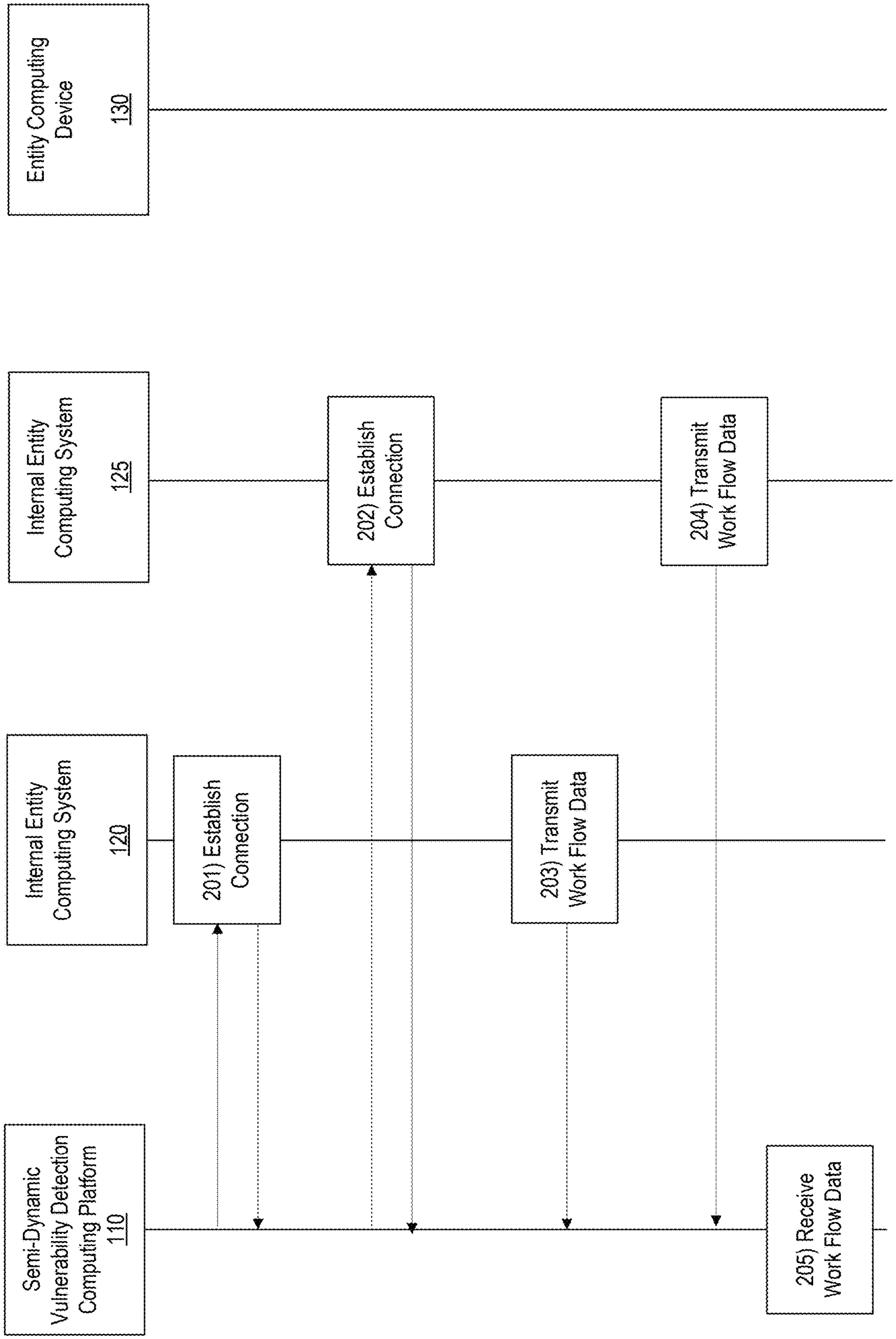
FIGS. 2A-2D depict an illustrative event sequence for semi-dynamic vulnerability detection in accordance with one or more aspects described herein.

With reference to FIG. 2A, at step 201, internal entity computing system 120 may establish a connection with semi-dynamic vulnerability detection computing platform 110. For instance, a first wireless connection may be established between internal entity computing system 120 and semi-dynamic vulnerability detection computing platform 110. Upon establishing the first wireless connection, a communication session may be initiated between internal entity computing system 120 and semi-dynamic vulnerability detection computing platform 110.

At step 202, internal entity computing system 125 may establish a connection with semi-dynamic vulnerability detection computing platform 110. For instance, a second wireless connection may be established between internal entity computing system 125 and semi-dynamic vulnerability detection computing platform 110. Upon establishing the second wireless connection, a communication session may be initiated between internal entity computing system 125 and semi-dynamic vulnerability detection computing platform 110.

At step 203, internal entity computing system 120 may transmit work flow data to the semi-dynamic vulnerability detection computing platform 110. For instance, work flow data capturing business functions of an enterprise organization and horizontal inputs may be transmitted to the semi-dynamic vulnerability detection computing platform 110 (e.g., during the communication session initiated upon establishing the first wireless connection).

At step 204, internal entity computing system 125 may transmit work flow data to the semi-dynamic vulnerability detection computing platform 110. For instance, work flow data capturing business functions of an enterprise organization and horizontal inputs may be transmitted to the semi-dynamic vulnerability detection computing platform 110 (e.g., during the communication session initiated upon establishing the second wireless connection).

Although work flow data from two internal entity computing systems is shown, data may be received from any number of systems without departing from the invention.

At step 205, semi-dynamic vulnerability detection computing platform 110 may receive the work flow data from one or more of internal entity computing system 120 and/or internal entity computing system 125.

Figure 2B:
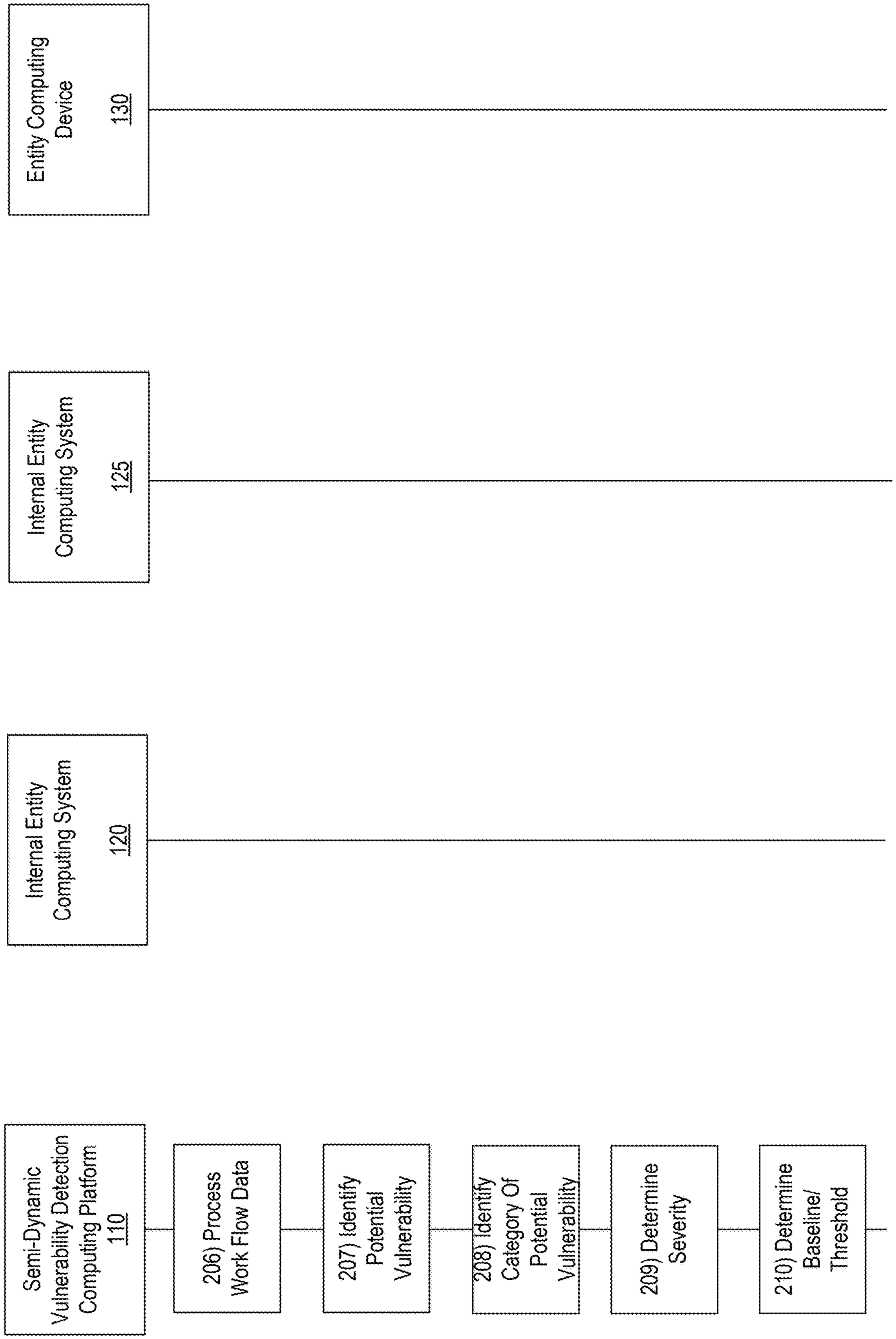

With reference to FIG. 2B, at step 206, semi-dynamic vulnerability detection computing platform 110 may process the work flow data received at step 205. For instance, a hyper-realistic vulnerability assessor may execute a GAN-based AI powered generator and discriminator to process the work flow data and, at step 207, identify a potential vulnerability.

At step 208, semi-dynamic vulnerability detection computing platform 110 may identify a category associated with the identified potential vulnerability. For instance, a category may be selected from predefined categories and the identified potential vulnerability may be tagged with the category of vulnerability.

At step 209, semi-dynamic vulnerability detection computing platform 110 may determine a severity of the potential vulnerability. For instance, a baseline estimator including a severity validator may receive the potential vulnerability and category tag and may determine a severity of the potential vulnerability based on the vulnerability and the category tag. In some examples, the severity validator may be SNN-based and may determine a severity tag for the potential vulnerability.

At step 210, semi-dynamic vulnerability detection computing platform 110 may determine a baseline of threshold of severity for further evaluation. For instance, the severity validator of the baseline estimator may determine a continuous, evolving baseline or threshold for further analysis of the potential vulnerability. For instance, if the severity value meets or exceeds the baseline or threshold, the process may continue at step 211. If the severity fails to meet the baseline or threshold, the process may end or return to step 205 to receive additional work flow data for analysis.

Figure 2C:
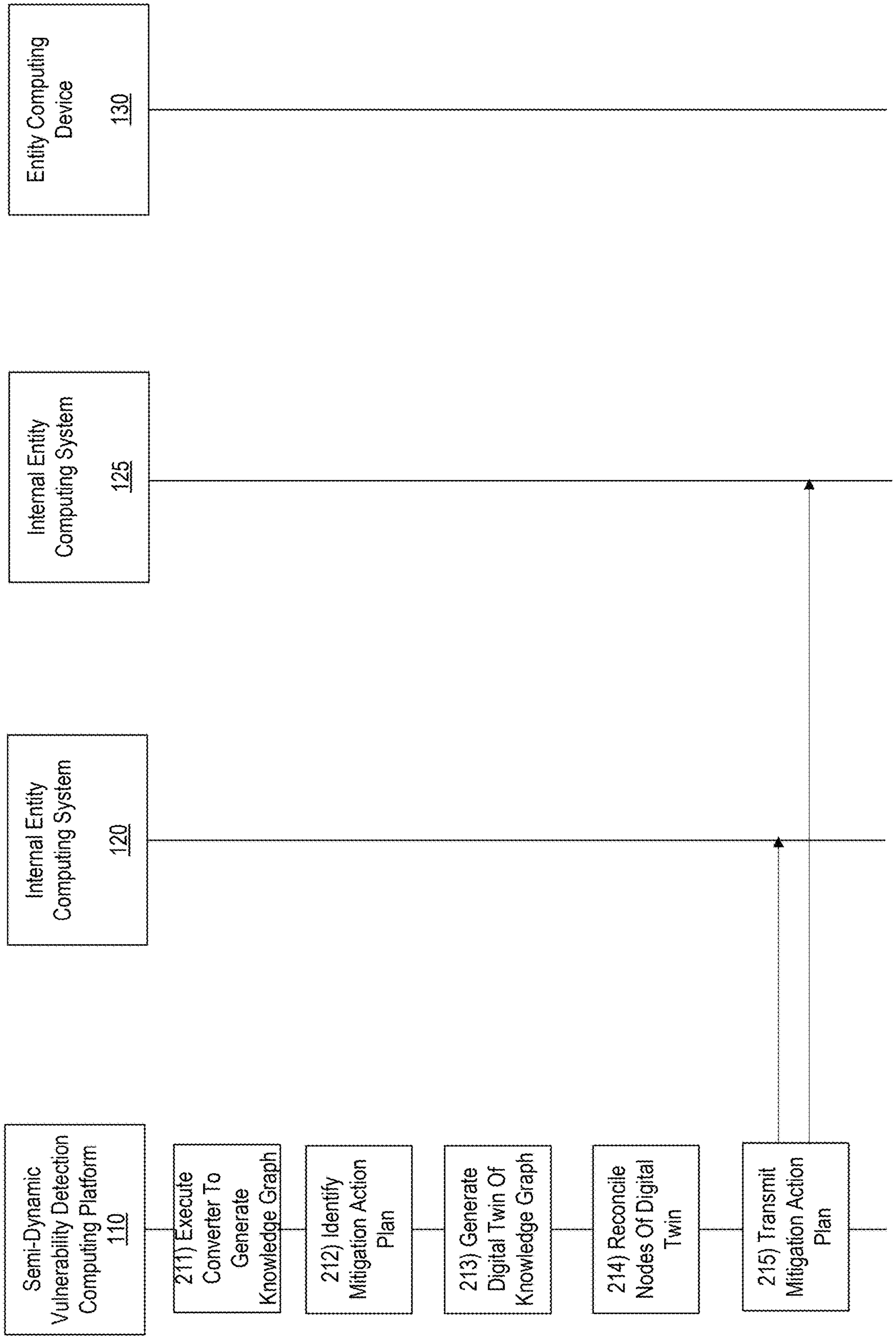

With reference to FIG. 2C, at step 211, semi-dynamic vulnerability detection computing platform 110 may execute a semi-dynamic baseline converter to generate a knowledge graph used to build a mitigation action plan for mitigating impact of the potential vulnerability. For instance, an ANN-SNN converter may be used to generate the knowledge graph and mitigation action plan. In some examples, the category and severity values may be used to as inputs to parameterized graph nodes to generate the knowledge graph and associated mitigation action plan. The nodes of the knowledge graph may "unfold" to determine the mitigation action plan based on the potential vulnerability, severity value and category value at step 212.

At step 213, semi-dynamic vulnerability detection computing platform 110 may generate a digital twin of the knowledge graph generated at step 211. For instance, pseudo-node back-track reconciler may generate a digital twin of the knowledge graph in order to reconcile or validate the nodes of the knowledge graph and corresponding mitigation action plan.

At step 214, semi-dynamic vulnerability detection computing platform 110 may reconcile or validate the nodes of the digital twin. For instance, pseudo-node back-track reconciler may use a back-tracking approach to refold the graph to its original form. For instance, the semi-dynamic vulnerability detection computing platform 110 may reverse engineer the mitigation action plan/knowledge graph node by node to reconcile values at each previous step and ensure no discrepancies exist. In some examples, if a discrepancy is detected, an instruction may be transmitted to the baseline estimator to re-tune or update the models and algorithms being used.

Further by "re-folding" the digital twin of the knowledge graph to its original form, no additional data is stored by the semi-dynamic vulnerability detection computing platform 110, which enables efficient processing and minimizes or optimizes resources used to process work flow data and detect vulnerabilities.

At step 215, if the digital twin of the knowledge graph is validated or reconciled (e.g., no discrepancies are detected), the mitigation action plan may be transmitted to one or more devices or systems. For instance, in some examples, semi-dynamic vulnerability detection computing platform 110 may transmit or send the mitigation action play to one or more of internal entity computing system 120 and/or internal entity computing system 125 (e.g., for automatic execution). Additionally or alternatively, the mitigation action plan may be transmitted to an entity computing device, such as device 130, for a user to evaluate and/or implement.

Figure 2D:
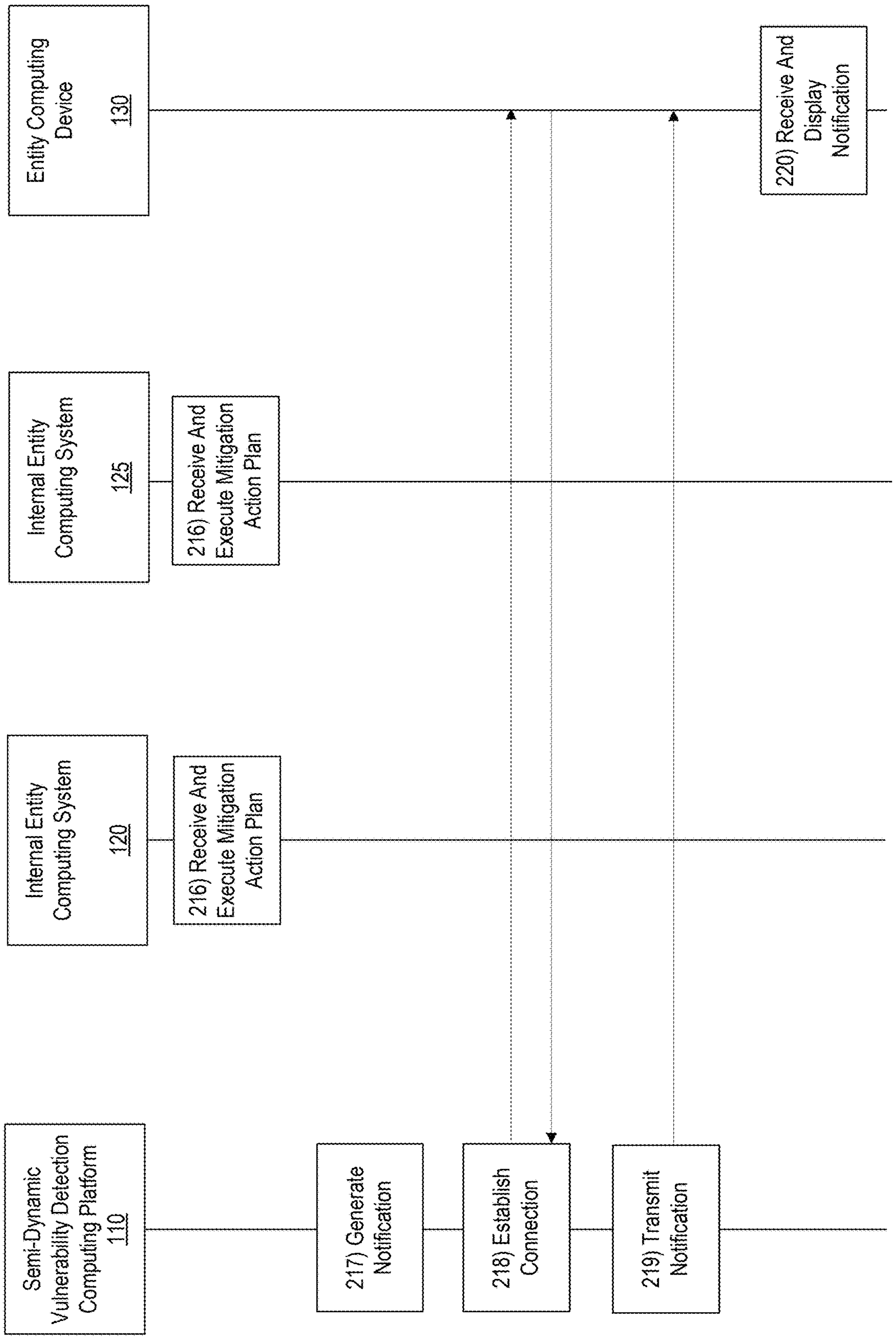

With reference to FIG. 2D, at step 216, internal entity computing system 120 and/or internal entity computing system 125 may receive and execute the mitigation action plan. In some examples, the mitigation action plan may be automatically executed upon the internal entity computing system 120 and/or internal entity computing system 125 receiving the mitigation action plan.

At step 217, semi-dynamic vulnerability detection computing platform 110 may generate one or more notifications. For instance, semi-dynamic vulnerability detection computing platform 110 may generate one or more notifications indicating that a potential vulnerability has been detected, that a mitigation action plan has been generated and reconciled, and or that the mitigation action plan has been executed. In some examples, the notification may include identification of systems, devices, applications, networks, or the like, that may be impacted by the identified vulnerability.

At step 218, semi-dynamic vulnerability detection computing platform 110 may establish a connection with entity computing device 130. For instance, a third wireless connection may be established between semi-dynamic vulnerability detection computing platform 110 and entity computing device 130. Upon establishing the third wireless connection, a communication session may be initiated between semi-dynamic vulnerability detection computing platform 110 and entity computing device 130.

At step 219, semi-dynamic vulnerability detection computing platform 110 may transmit or send the generated notification to the entity computing device 130 (e.g., during the communication session initiated upon establishing the third wireless connection). In some examples, transmitting or sending the notification may cause the notification to be displayed by a display of the entity computing device 130.

Figure 4:
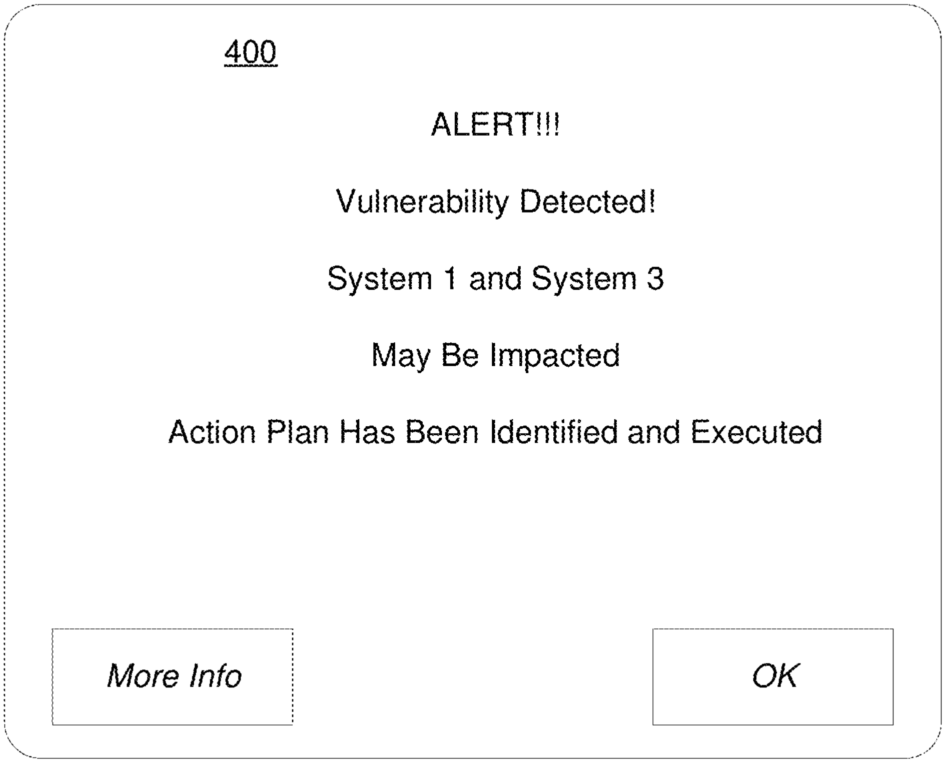
FIG. 4 illustrates an example notification that may be generated in accordance with one or more aspects described herein.

At step 220, entity computing device 130 may receive the notification and display the notification on a display of entity computing device 130. For instance, FIG. 4 illustrates one example notification 400 that includes an indication that a vulnerability was detected, identifies one or more impacted systems, and indicates that an action plan has been identified and executed. Various other notifications may be used without departing from the invention.

Figure 3A:
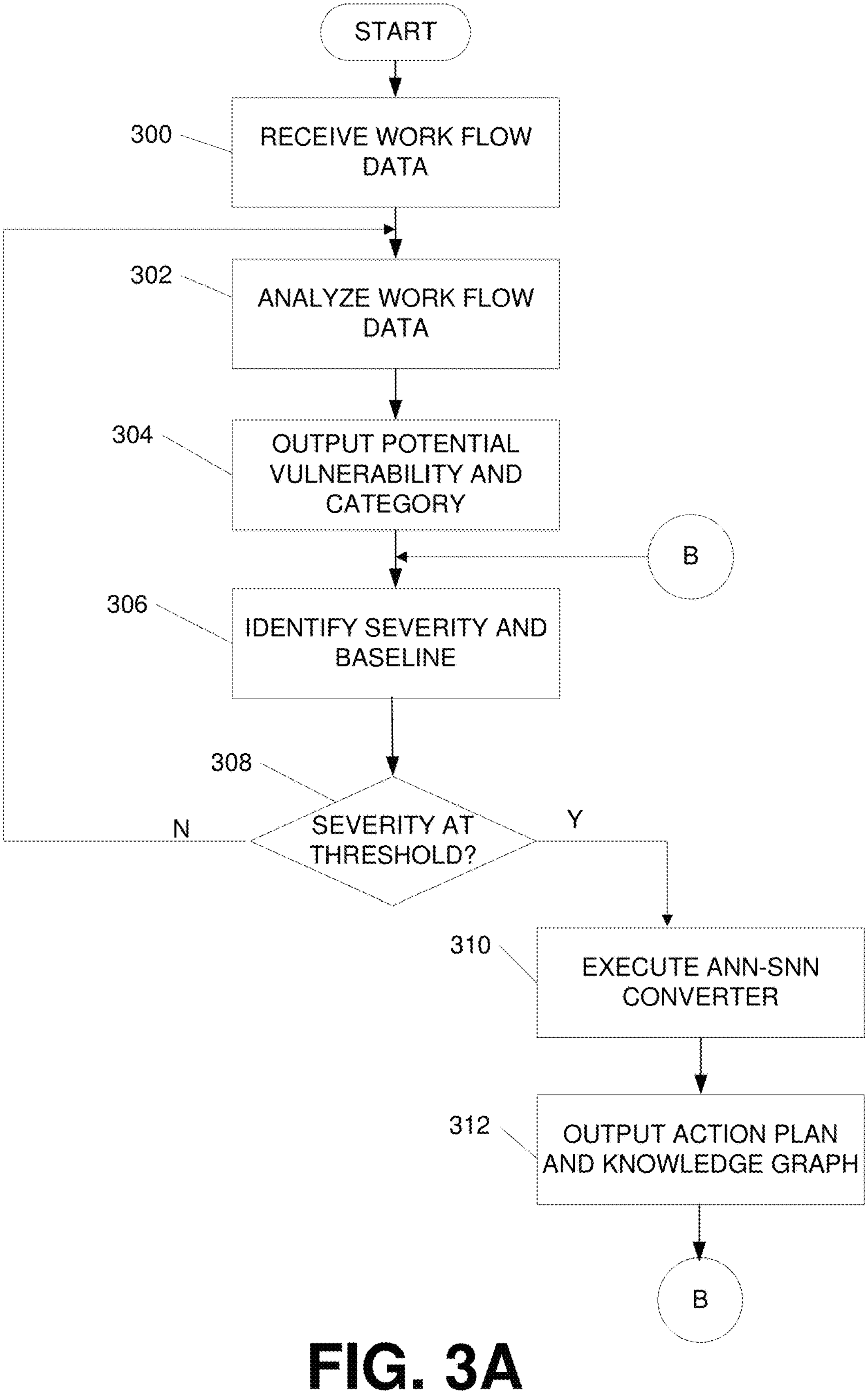
FIGS. 3A and 3B illustrate an illustrative method for semi-dynamic vulnerability detection according to one or more aspects described herein.
Figure 3B:
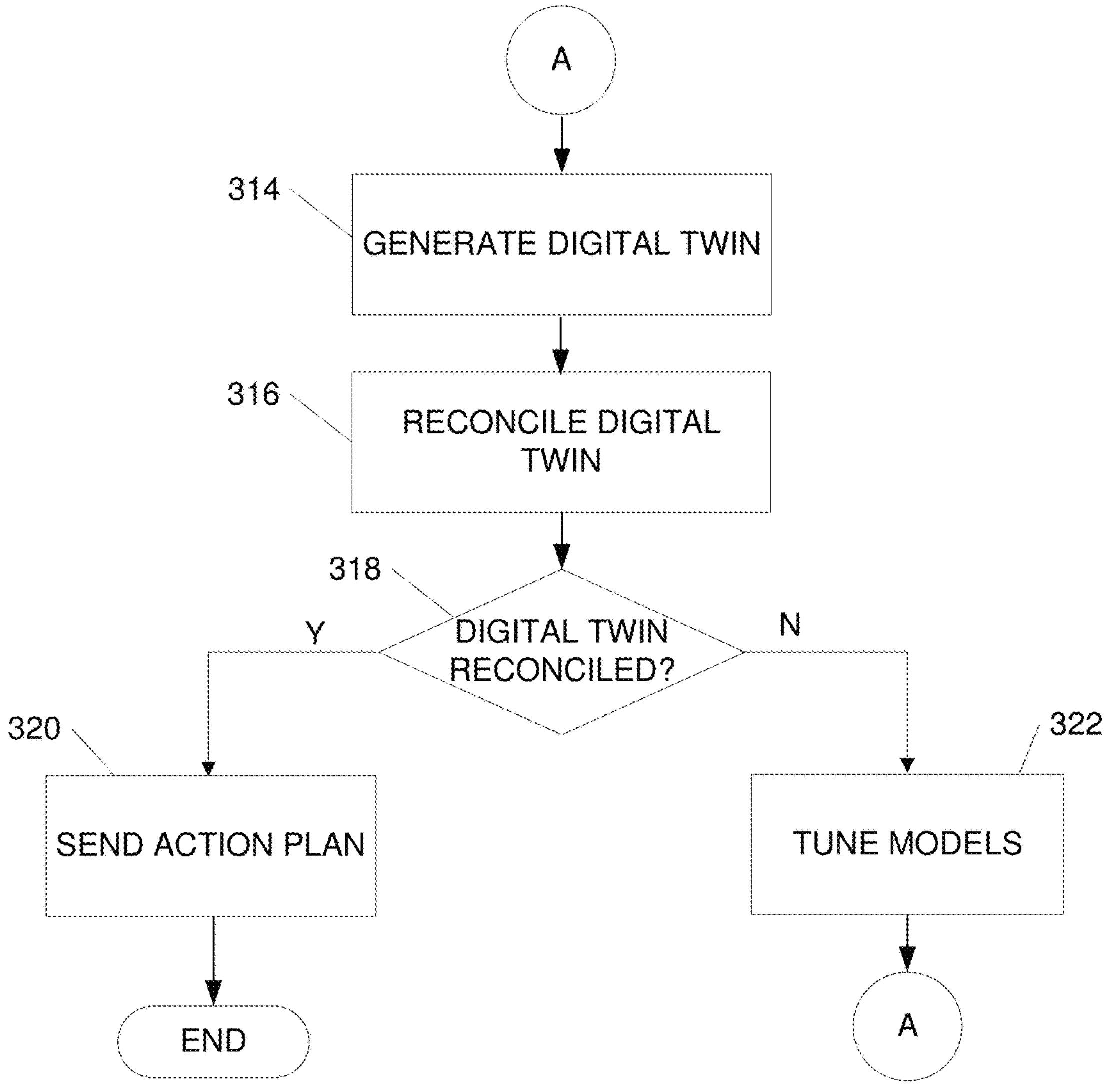

FIGS. 3A and 3B are a flow chart illustrating one example method of semi-dynamic vulnerability detection in accordance with one or more aspects described herein. The processes illustrated in FIGS. 3A and 3B are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIGS. 3A and 3B may be performed in real-time or near real-time.

With reference to FIG. 3A, at step 300, semi-dynamic vulnerability detection computing platform 110 may receive work flow data. For instance, semi-dynamic vulnerability detection computing platform 110 may receive work flow data from a plurality of devices or systems, such as internal entity computing system 120, internal entity computing system 125, or the like.

At step 302, the semi-dynamic vulnerability detection computing platform 110 may analyze the work flow data to identify one or more potential vulnerabilities. For instance, a GAN-based model may be used to identify potential vulnerabilities in work flow data and identify a category associated with the potential vulnerability.

At step 304, the potential vulnerability and identified category may be output by the semi-dynamic vulnerability detection computing platform 110.

At step 306, semi-dynamic vulnerability detection computing platform 110 may determine a severity associated with the potential vulnerability, as well as a baseline or threshold for further evaluation. For instance, an SNN-based severity validator may determine a severity associated with the potential vulnerability based on the identified potential vulnerability and category. In some examples, the severity validator may identify a baseline or threshold for further evaluation based on, for instance, the identified category. In some examples, the baseline or threshold may be a continuous, evolving threshold.

At step 308, semi-dynamic vulnerability detection computing platform 110 may determine whether the severity determined (e.g., a value associated with the severity determined or identified at step 306) meets or exceeds the threshold. If not, the process may return to step 302 to analyze additional work flow data. If, at step 308, the threshold is met, at step 310, an ANN-SNN converter may be executed. At step 312, execution of the ANN-SNN converter may output a knowledge graph having a plurality of nodes. The knowledge graph may unfold to identify a mitigation action plan to mitigate impact of the potential vulnerability. The knowledge graph may be generated based on the category of vulnerability, severity value, and the like.

With reference to FIG. 3B, at step 314, the semi-dynamic vulnerability detection computing platform 110 may generate a digital twin of the knowledge graph. At step 316, the digital twin may be reconciled by reverse engineering each node or back tracking through each node of the digital twin to validate each node. For instance, each node may be a sum of two previous nodes. In some examples, validating the digital twin may cause the knowledge graph to refold to its original state, which may reduce or eliminate storage of data.

At step 318, semi-dynamic vulnerability detection computing platform 110 may determine whether the digital twin is validated or reconciled. For instance, semi-dynamic vulnerability detection computing platform 110 may identify any discrepancies in the nodes. If the digital twin is validated (e.g., no discrepancies are identified), the generated mitigation action plan may be transmitted to a computing device, such as entity computing device 130, internal entity computing system 120, internal entity computing system 125, or the like, for execution at step 320. In some examples, validating the digital twin may include deleting the digital twin. If the digital twin is not validated (e.g., one or more discrepancies are identified), the one or more models may be tuned or re-turned at step 322 and the process may return to step 306 in FIG. 3A to identify the severity and baseline of the potential vulnerability after tuning the models.

As discussed herein, aspects provided include a semi-dynamic system for identifying potential system vulnerabilities. The arrangements described herein might not rely on pre-trained models and, instead, may dynamically learn and evaluate data upon arrival to determine whether any potential vulnerabilities exist. Accordingly, the system may provide and end-to-end model to identify and respond to newly identified vulnerabilities that might not have been encountered by the systems before and respond to ever-changing risks. The arrangements described herein also limit the amount of data being stored because training data might not be used with the models described.

As discussed herein, an ANN-SNN converter may be used to generate a knowledge graph and associated mitigation action plan. In some examples, dynamic converters of this nature may be performance intensive. Accordingly, in some arrangements, user input may be provided to adjust performance (e.g., accuracy vs. performance) in order to minimize computing resources used. For instance, in some examples, user input may be received to narrow a mitigation action plan, identify aspects that are not needed for a particular system or vulnerability, or the like. In some examples, potential vulnerabilities may be assigned different severity values or different business units, entities, or the like. Accordingly, action plans may be generated based on input indicating unique features or aspects of business units, in order to avoid generating unnecessary parts of the plan. Accordingly, the computing resources used may be reduced or optimized. For instance, with static ANN-SNN convertors being less accurate and dynamic ones being performance intensive, the semi-dynamic approach for SNN-ANN conversion described herein mitigates the technical gap.

As further discussed herein, the mitigation action plan (and digital twin) may be reconciled or validated in real-time to ensure performance is maximized. Further, if any discrepancies are detected during validation or reconciliation, one or more models may be tuned and a severity and/or baseline may be re-determined for the potential vulnerability, in order to ensure accuracy. Additionally, the session specific graph twin is the digital twin version of graph which auto folds to its original form by backtracking every node for real time reconciliation. The dynamic SNN based baseline estimator re-evaluates itself based on multiple internal and external factors. The overall system might not hold any history data and hence the AI decisioning is purely based on real time vulnerabilities being faced.

Further, the arrangements described herein may be scalable to new vulnerabilities and prioritize to identify emerging vulnerabilities, allowing the end-users to get a smaller number of vulnerability factors to focus on with a clearly defined action plan. In some examples, the systems described herein may pre-empt vulnerability by identifying patterns.

As discussed, the semi-dynamic baseline convertor is based on static parameterized knowledge graph nodes that may be assigned dynamic respective values from the GAN and SNN systems and dynamically form co-relation. This may enable the system to process the skeleton blueprint of the conversion even before the actual values get assigned making it cognizant of performance and accuracy with user-controlled inputs making the overall system self-evolving and sustainable.

Further, the pseudo node backtracking system may include an AI system that works on no previous history data making it a data storage free system. As described, it may generate a digital twin of the graph during session run and may reverse engineer the plan node by node by dissecting every step to reconcile the values at every previous step leading to the current state. This helps to determine any potential error in the action plan and enables the parameterized graph nodes to free up the values and fold back to their original state once the session is over. The graph folding technique may enable the system to free up the session specific relations and values from the nodes, freeing up nodes for a next session run automatically and may load balance the system.

Figure 5:
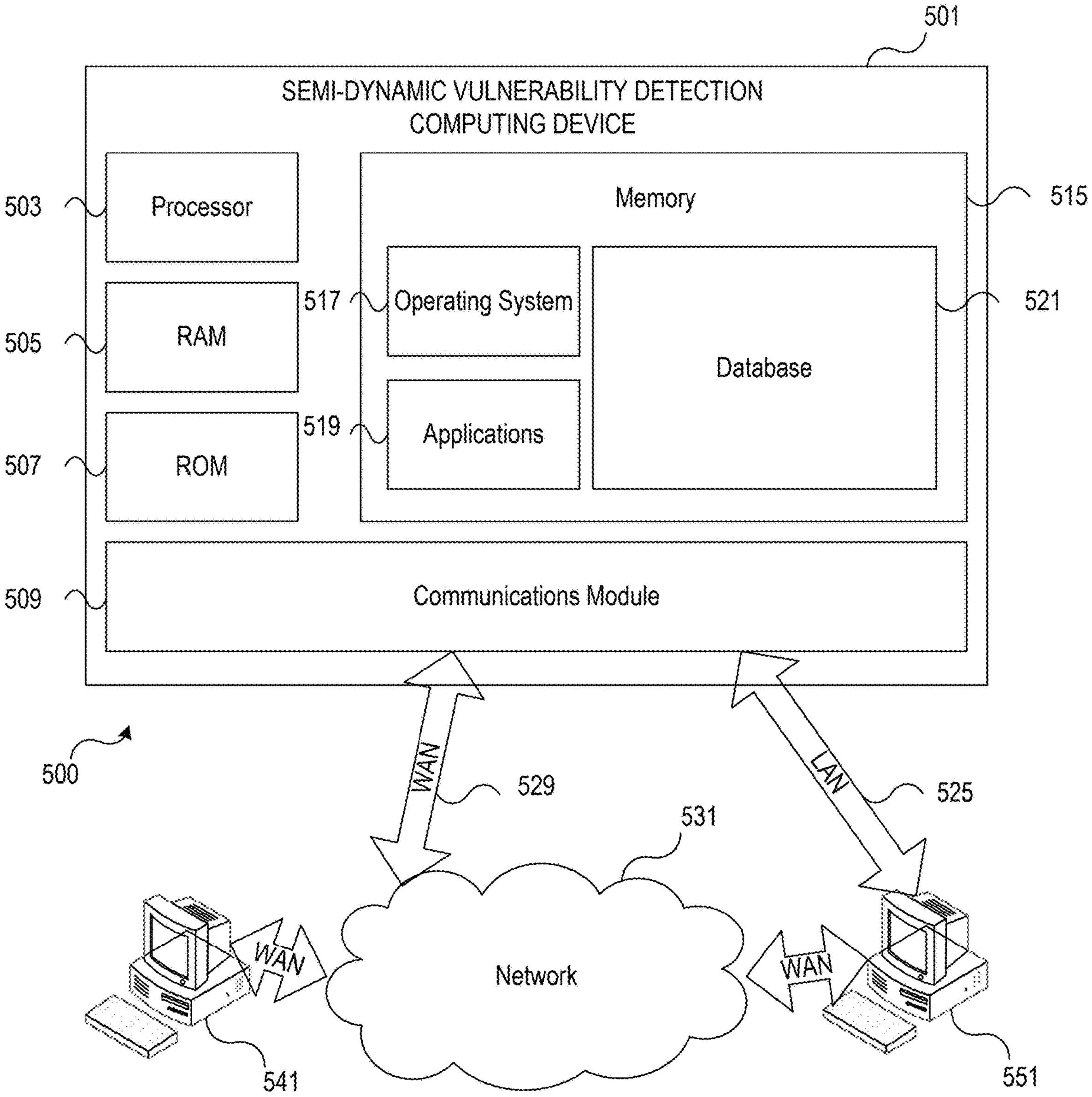
FIG. 5 illustrates one example environment in which various aspects of the disclosure may be implemented in accordance with one or more aspects described herein.

FIG. 5 depicts an illustrative operating environment in which various aspects of the present disclosure may be implemented in accordance with one or more example embodiments. Referring to FIG. 5, computing system environment 500 may be used according to one or more illustrative embodiments. Computing system environment 500 is only one example of a suitable computing environment and is not intended to suggest any limitation as to the scope of use or functionality contained in the disclosure. Computing system environment 500 should not be interpreted as having any dependency or requirement relating to any one or combination of components shown in illustrative computing system environment 500.

Computing system environment 500 may include semi-dynamic vulnerability detection computing device 501 having processor 503 for controlling overall operation of semi-dynamic vulnerability detection computing device 501 and its associated components, including Random Access Memory (RAM) 505, Read-Only Memory (ROM) 507, communications module 509, and memory 515. Semi-dynamic vulnerability detection computing device 501 may include a variety of computer readable media. Computer readable media may be any available media that may be accessed by semi-dynamic vulnerability detection computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by semi-dynamic vulnerability detection computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on semi-dynamic vulnerability detection computing device 501. Such a processor may execute computer-executable instructions stored on a computer-readable medium.

Software may be stored within memory 515 and/or storage to provide instructions to processor 503 for enabling semi-dynamic vulnerability detection computing device 501 to perform various functions as discussed herein. For example, memory 515 may store software used by semi-dynamic vulnerability detection computing device 501, such as operating system 517, application programs 519, and associated database 521. Also, some or all of the computer executable instructions for semi-dynamic vulnerability detection computing device 501 may be embodied in hardware or firmware. Although not shown, RAM 505 may include one or more applications representing the application data stored in RAM 505 while semi-dynamic vulnerability detection computing device 501 is on and corresponding software applications (e.g., software tasks) are running on semi-dynamic vulnerability detection computing device 501.

Communications module 509 may include a microphone, keypad, touch screen, and/or stylus through which a user of semi-dynamic vulnerability detection computing device 501 may provide input, and may also include one or more of a speaker for providing audio output and a video display device for providing textual, audiovisual and/or graphical output. Computing system environment 500 may also include optical scanners (not shown).

Semi-dynamic vulnerability detection computing device 501 may operate in a networked environment supporting connections to one or more remote computing devices, such as computing devices 541 and 551. Computing devices 541 and 551 may be personal computing devices or servers that include any or all of the elements described above relative to semi-dynamic vulnerability detection computing device 501.

The network connections depicted in FIG. 5 may include Local Area Network (LAN) 525 and Wide Area Network (WAN) 529, as well as other networks. When used in a LAN networking environment, semi-dynamic vulnerability detection computing device 501 may be connected to LAN 525 through a network interface or adapter in communications module 509. When used in a WAN networking environment, semi-dynamic vulnerability detection computing device 501 may include a modem in communications module 509 or other means for establishing communications over WAN 529, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:

at least one processor;

a communication interface communicatively coupled to the at least one processor; and a memory storing computer-readable instructions that, when executed by the at least one processor, cause the computing platform to:

receive, from one or more computing systems, work flow data;

analyze, using a generative adversarial network (GAN), the work flow data to identify potential vulnerabilities in the work flow data;

output, by the GAN, a potential vulnerability in the work flow data and a category of the potential vulnerability;

identify, based on the output potential vulnerability and the category of the potential vulnerability, a severity of the potential vulnerability;

execute, based on the potential vulnerability, the category of the potential vulnerability and the severity of the potential vulnerability, an artificial neural network (ANN)-spiking neural network (SNN) converter, wherein the ANN-SNN converter takes the potential vulnerability and the category of the potential vulnerability as inputs and uses graph nodes to assign values to ANN and SNN based algorithms to form correlations between parameters, and wherein the values are input to parameterized graph nodes having predetermined range variations;

output, based on the executing the ANN-SNN converter, an action plan to address the potential vulnerability, wherein the action plan is based on a knowledge graph having a plurality of nodes, wherein nodes of the knowledge graph unfold to determine the action plan;

generate, by a pseudo-node back-track reconciler, a session specific graph twin of the knowledge graph;

reconcile the session specific graph twin of the knowledge graph, reconciling the session specific graph twin including backtracking through each node to validate each node of the session specific graph twin of the knowledge graph, wherein reconciling includes reconciling values at each previous step leading to a current state, and wherein each node is a sum of two previous nodes; and based on the session specific graph twin being reconciled, transmit the action plan to a computing device for execution.

2. The computing platform of claim 1, wherein the severity of the potential vulnerability is determined using an SNN based severity validator.

3. The computing platform of claim 2, wherein the SNN based severity validator further determines a threshold for further analysis based on the category of the potential vulnerability.

4. The computing platform of claim 3, wherein the threshold is an evolving, continuous threshold.

5. The computing platform of claim 3, further including instructions that, when executed, cause the computing platform to:

compare a value of the severity of the potential vulnerability to the threshold; and based on determining that the value of the severity of the potential vulnerability meets or exceeds the threshold, output, based on the executing the ANN-SNN converter, the action plan to address the potential vulnerability.

6. The computing platform of claim 2, wherein reconciling the session specific graph twin of the knowledge graph includes identifying any discrepancies in nodes of the session specific graph twin.

7. The computing platform of claim 6, wherein identifying any discrepancies causes the SNN based severity validator to re-tune.

8. The computing platform of claim 1, further including instructions that, when executed, cause the computing platform to:

responsive to the session specific graph twin being reconciled, delete the session specific graph twin.

9. A method, comprising:

receiving, by a computing platform, the computing platform having at least one processor, and memory, and from one or more computing systems, work flow data;

analyzing, by the at least one processor and using a generative adversarial network (GAN), the work flow data to identify potential vulnerabilities in the work flow data;

outputting, by the GAN, a potential vulnerability in the work flow data and a category of the potential vulnerability;

identifying, by the at least one processor and based on the output potential vulnerability and the category of the potential vulnerability, a severity of the potential vulnerability;

executing, by the at least one processor and based on the potential vulnerability, the category of the potential vulnerability and the severity of the potential vulnerability, an artificial neural network (ANN)-spiking neural network (SNN) converter, wherein the ANN-SNN converter takes the potential vulnerability and the category of the potential vulnerability as inputs and uses graph nodes to assign values to ANN and SNN based algorithms to form correlations between parameters, and wherein the values are input to parameterized graph nodes having predetermined range variations;

outputting, by the at least one processor and based on the executing the ANN-SNN converter, an action plan to address the potential vulnerability, wherein the action plan is based on a knowledge graph having a plurality of nodes, wherein nodes of the knowledge graph unfold to determine the action plan;

generating, by the at least one processor, a session specific graph twin of the knowledge graph;

reconciling, by the at least one processor, the session specific graph twin of the knowledge graph, reconciling the session specific graph twin including backtracking through each node to validate each node of the session specific graph twin of the knowledge graph, wherein reconciling includes reconciling values at each previous step leading to a current state, and wherein each node is a sum of two previous nodes; and based on the session specific graph twin being reconciled, transmitting, by the at least one processor, the action plan to a computing device for execution.

10. The method of claim 9, wherein the severity of the potential vulnerability is determined using an SNN based severity validator.

11. The method of claim 10, wherein the SNN based severity validator further determines a threshold for further analysis based on the category of the potential vulnerability.

12. The method of claim 11, wherein the threshold is an evolving, continuous threshold.

13. The method of claim 11, further including:

comparing, by the at least one processor, a value of the severity of the potential vulnerability to the threshold; and based on determining that the value of the severity of the potential vulnerability meets or exceeds the threshold, outputting, by the at least one processor and based on the executing the ANN-SNN converter, the action plan to address the potential vulnerability.

14. The method of claim 10, wherein reconciling the session specific graph twin of the knowledge graph includes identifying any discrepancies in nodes of the session specific graph twin.

15. The method of claim 14, wherein identifying any discrepancies causes the SNN based severity validator to re-tune.

16. The method of claim 9, further including:

responsive to the session specific graph twin being reconciled, deleting, by the at least one processor, the session specific twin.

17. One or more non-transitory computer-readable media storing instructions that, when executed by a computing platform comprising at least one processor, memory, and a communication interface, cause the computing platform to:

receive, from one or more computing systems, work flow data;

analyze, using a generative adversarial network (GAN), the work flow data to identify potential vulnerabilities in the work flow data;

output, by the GAN, a potential vulnerability in the work flow data and a category of the potential vulnerability;

identify, based on the output potential vulnerability and the category of the potential vulnerability, a severity of the potential vulnerability;

execute, based on the potential vulnerability, the category of the potential vulnerability and the severity of the potential vulnerability, an artificial neural network (ANN)-spiking neural network (SNN) converter, wherein the ANN-SNN converter takes the potential vulnerability and the category of the potential vulnerability as inputs and uses graph nodes to assign values to ANN and SNN based algorithms to form correlations between parameters, and wherein the values are input to parameterized graph nodes having predetermined range variations;

output, based on the executing the ANN-SNN converter, an action plan to address the potential vulnerability, wherein the action plan is based on a knowledge graph having a plurality of nodes, wherein nodes of the knowledge graph unfold to determine the action plan;

generate a session specific graph twin of the knowledge graph;

reconcile the session specific graph twin of the knowledge graph, reconciling the session specific graph twin including backtracking through each node to validate each node of the session specific graph twin of the knowledge graph; and based on the session specific graph twin being reconciled, transmit the action plan to a computing device for execution.

18. The one or more non-transitory computer-readable media of claim 17, wherein the severity of the potential vulnerability is determined using an SNN based severity validator.

19. The one or more non-transitory computer-readable media of claim 18, wherein the SNN based severity validator further determines a threshold for further analysis based on the category of the potential vulnerability.

20. The one or more non-transitory computer-readable media of claim 19, further including instructions that, when executed, cause the computing platform to:

compare a value of the severity of the potential vulnerability to the threshold; and based on determining that the value of the severity of the potential vulnerability meets or exceeds the threshold, output, based on the executing the ANN-SNN converter, the action plan to address the potential vulnerability.

* * * * *